United States Patent [19]

O'Leary et al.

[11] Patent Number: 5,249,967
[45] Date of Patent: Oct. 5, 1993

[54] SPORTS TECHNIQUE VIDEO TRAINING DEVICE

[75] Inventors: George P. O'Leary, 2611 NW. Westover Rd., Portland, Oreg. 97210; Stephen G. Owen, Portland, Oreg.

[73] Assignee: George P. O'Leary, Portland, Oreg.

[21] Appl. No.: 729,466

[22] Filed: Jul. 12, 1991

[51] Int. Cl.⁵ .............................................. A63B 69/00
[52] U.S. Cl. .................................... 434/247; 434/252; 434/257; 273/183.1; 273/186.1; 273/35 A
[58] Field of Search .............. 434/247, 252, 257, 258; 273/35 R, 35 A, 29 R, 29 A, 26 R, 26 A, 183 R, 186 R, 186 C, DIG. 28

[56] References Cited

U.S. PATENT DOCUMENTS

| | | | |
|---|---|---|---|
| 2,494,000 | 1/1950 | Robertson | 434/257 |
| 3,145,484 | 8/1964 | Bayley | 434/257 |
| 3,353,282 | 11/1967 | Sneed | 434/257 |
| 3,408,750 | 11/1968 | McCullough | 35/29 |
| 3,611,591 | 10/1971 | Light | 35/29 |
| 3,915,457 | 10/1975 | Casey | 273/183 |
| 4,005,261 | 1/1977 | Sato et al. | 434/252 |
| 4,015,344 | 4/1977 | Michaels | 35/29 |
| 4,137,566 | 1/1979 | Haas | 364/410 |
| 4,828,500 | 5/1989 | Seidel | 434/247 |
| 4,891,748 | 1/1990 | Mann | 364/410 |

FOREIGN PATENT DOCUMENTS

2565722 12/1985 France ............... 273/35 A

Primary Examiner—Jessica Harrison
Attorney, Agent, or Firm—Chernoff, Vilhauer, McClung & Stenzel

[57] ABSTRACT

A video training device and method for enabling a student athlete to closely pattern his dynamic technique after that of a recognized master. The exemplary device includes a pair of video cameras that transmit live images of the student as seen from those directions that best represent the technique. A video overlay generator receives the live images and combines them, while still in their video signal format, with a corresponding set of self-generated template images that represent, in static outline form, the dynamic technique of the master in the desired sport situation. The combined sets of images are sent to a pair of visual monitors for simultaneous, superimposed display of each set on a respective screen. User-operated controls on the video overlay generator permit the static image on each screen to be adjusted in size, moved vertically or horizontally, or switched to a new static image representing a different sport situation. In practicing the method, the student, preferably viewing both screens in a mirror, maneuvers his or her extremities, including those defined by the sports equipment, so that the live image of each extremity moves across those display locations of a respective screen that are occupied by different portions of the corresponding outline. For example, in a golf swing, the dominant arm of the student that leads the downswing is preferably maneuvered in increasing pronation as the transition between the backswing and downswing portion of the technique is approached.

15 Claims, 8 Drawing Sheets

| NORMAL TEXT | REVERSED TEXT |
|---|---|
| NAME OF PROFESSIONAL GOLFER | NAME OF PROFESSIONAL GOLFER |

→ 9 IRON SIDE VIEW
9 IRON FRONT VIEW
7 IRON SIDE
7 IRON FRONT
5 IRON SIDE
5 IRON FRONT
3 IRON SIDE
3 IRON FRONT
3 WOOD SIDE
3 WOOD FRONT
DRIVER SIDE
DRIVER FRONT
PITCH SHOT SIDE
PITCH SHOT FRONT
CHIP SHOT SIDE
CHIP SHOT FRONT
SAND SHOT SIDE
SAND SHOT FRONT
PUTT SIDE VIEW
PUTT FRONT VIEW
BLANK (NO OVERLAY)

'PRESS UP/DOWN TO MOVE CURSOR'
'PRESS SELECT TO DISPLAY SWING'

108 — 'PRESS SELECT TO DISPLAY SETUP, BACKSWING AND DOWNSWING SEPARATELY'
106 — 'PRESS PAN UP/DOWN OR PAN LEFT/RIGHT TO ALIGN BALL POSITION'
'TURN ZOOM OUT/IN TO ENLARGE OR SHRINK DRAWING TO FIT GOLFER'S SIZE'
110 — 'PRESS MENU TO RETURN TO LIST OF DRAWINGS'

'PRESS MENU TO RETURN TO LIST OF DRAWINGS',
'TURN ZOOM OUT/IN TO ENLARGE OR SHRINK DRAWING TO FIT GOLFER'S SIZE',
'PRESS PAN UP/DOWN OR PAN LEFT/RIGHT TO ALIGN BALL POSITION',
'PRESS SELECT TO DISPLAY SETUP, BACKSWING AND DOWNSWING SEPARATELY',

SPORTS TECHNIQUE VIDEO TRAINING DEVICE

BACKGROUND OF THE INVENTION

The following invention relates to a training device for athletes and more particularly, to a video system which may be used by student athletes engaged in a sports activity in order to match their dynamic technique with that of a recognized master in the field.

There are a number of visual systems that provide overlays by superimposing two dynamic video representations of the same activity. Such systems are shown, for example, in Michaels et al. U.S. Pat. No. 4,015,344, Haas et al. U.S. Pat. No. 4,137,566, McCullough et al. U.S. Pat. No. 3,408,750 and Seidel et al. U.S. Pat. No. 4,828,500.

All of these references make use of a directly recorded image of the master, such as on video tape, taken while the master is performing a particular dynamic technique and provide the student with a means of overlaying an image of his own technique against that of the master in order to determine what deviations exist. These systems, however, are difficult to use and to calibrate. Because of the different sizes and positions of the images, it is hard to exactly overlay the two images. Further, the two images are time based. That is, because they are dynamic representations of the sports activity, in order to be useful to the student the movements must take place at the same relative time. This is especially true in a context in which the positions of the body and its extremities, or equipment such as a bat, tennis racket, or golf club, are to be compared at different points of the stroke.

In many athletic endeavors, however, the rate of speed at which an activity is performed is not as important as the position of the hands, arms, or feet at different times during the movement. For example, a golf swing is highly dependent upon maintaining certain desired positions of the hands, the arms, the head, and the position of the club at various points during the swing. Moreover, these time-based systems, are difficult for a student to use interactively, that is, as he or she is actually performing the technique. During practice of a golf swing, for example, as the student is observing the moving image of the master on the overlaid display, the student would not only have to match the various arm, head, and club head positions of the master, but would also have to swing the club with the same degree of force (which is time dependent) in order to affect a valid comparison at all points during the swing.

An alternative type of system is shown in Mann, U.S. Pat. No. 4,891,748. In this system, a computer-generated image is made representing the cumulative technique of several masters. This image is scaled, by the computer, to the size of the student's image and is advanced, frame-by-frame, on the overlay display, so that the student can imitate the static pose recorded in each frame. Unless there is someone available who is willing to assist with this system, however, the student must either select each frame, forcing the student to repeatedly break his own stance while selecting the individual frames representing a particular movement, or rely on automatic frame advancement, forcing the student to keep pace with the preselected rate at which the frames are advanced. Moreover, the elaborate software needed to operate this system is expensive to develop and must be customized for each individual student.

Less complex systems are known that use a mirror to perform an overlay function, such as those shown in Light U.S. Pat. No. 3,611,591 and Casey U.S. Pat. No. 3,915,457. In Casey, for example, a transparent sheet bearing an image of the master in a number of different poses is set directly over a convex mirror, thereby forming an overlay together with the image of the student reflected in the mirror. Only a relatively limited number of poses can be represented with clarity on any one sheet, however, forcing the student to repeatedly interrupt practice to replace transparencies. Moreover, with such systems, the student can only observe his technique from a single direction opposite the normal line of sight for that technique. During a normal golf swing, for example, the student will be looking in a forward direction down toward the golf ball and will not be able to assess his technique as it appears in a mirror that is placed off to one side or above his head. Nor do these systems permit assessment of technique from multiple views at once.

Accordingly, what is needed, then, is an inexpensive interactive training system that enables a student to compare his dynamic technique in a sport with that of a master's from whatever view and with whatever pace is most effective in that sport for that particular student.

SUMMARY OF THE PRESENT INVENTION

To achieve these ends, the present invention includes a video camera for transmitting a live image of the dynamic technique of the student in a selected sports situation as viewed from the most representative direction and a visual monitor for displaying the live image to the student. A video overlay generator is provided for producing a static image representing the dynamic technique of the master in the same sport situation and as viewed from the same direction, and includes an overlay mechanism for combining the live image and the static image for simultaneous superimposed display on the visual monitor.

The static representation of the dynamic technique of the master could include a series of outlines where each outline delineates the path of travel of a respective extremity of the master during execution of the technique. For example, a continuous or dashed outline could be used to represent the path of travel of the master's hands during the swing. A different outline, moreover, could be used to represent the path of travel of the golf club head during the backswing and a further outline could be used to represent positions of the golf club head on the downswing.

In order for the athlete to be able to monitor his own technique as it is being executed, the visual monitors are placed within the athlete's line of sight. The monitors may provide a split-screen so that the live image of the athlete, as viewed from two or more different directions, can be observed simultaneously in superimposed overlay with the master's image. Where the athlete's line of sight is limited, such as when looking down on a golf ball, a mirror can be used to enable viewing of both screens. When a mirror is used, the visual overlay could be accomplished either with a video template generated as explained below or with a permanent template comprising a translucent drawing secured to the screen of one or both monitors. Use of a mirror is also beneficial because it converts the direct image displayed on the monitors, which includes a view of the student from the perspective in which others see the student, into a reverse image, which includes a view of the student from the perspective in which the student normally sees himself or herself.

A video overlay generator may be provided which generates a plurality of video images or "templates" for selective combination, as by conventional television mixing equipment, with the live image of the athlete as transmitted by the video camera. Each template is a static image representing the dynamic technique of the master in a different sport situation, such as during a golf swing with a certain type of club. The video overlay generator may provide controls operable by the athlete for calibrating images so that the position and spatial dimensions of the template are matched with that of the athlete's on-screen image to create a closely superimposed overlay. The memory in the video overlay generator may include a menu image to provide an on-screen list of a plurality of different templates, corresponding to different sports situations, and from which the athlete may select a particular template of interest.

A second aspect of the present invention includes a training method. In this method, a live image of the dynamic technique of the student is transmitted using a video camera and is combined with a static image of the dynamic technique of the master for simultaneous superimposed display on a visual monitor. The camera can be positioned for whatever view will best show the technique. The static image provided includes an outline wherein different portions of the outline delineate the path of travel of a selected extremity of the master. Where the selected sports situation is a golf swing that includes a transition between a backswing and a downswing, and the student has a "dominant" arm leading the downswing, preferably the method includes maneuvering the dominant arm of the student in increasing pronation as said transition is approached by using the outline as a guide or "template."

DETAILED DESCRIPTION OF THE INVENTION

Figure 1:
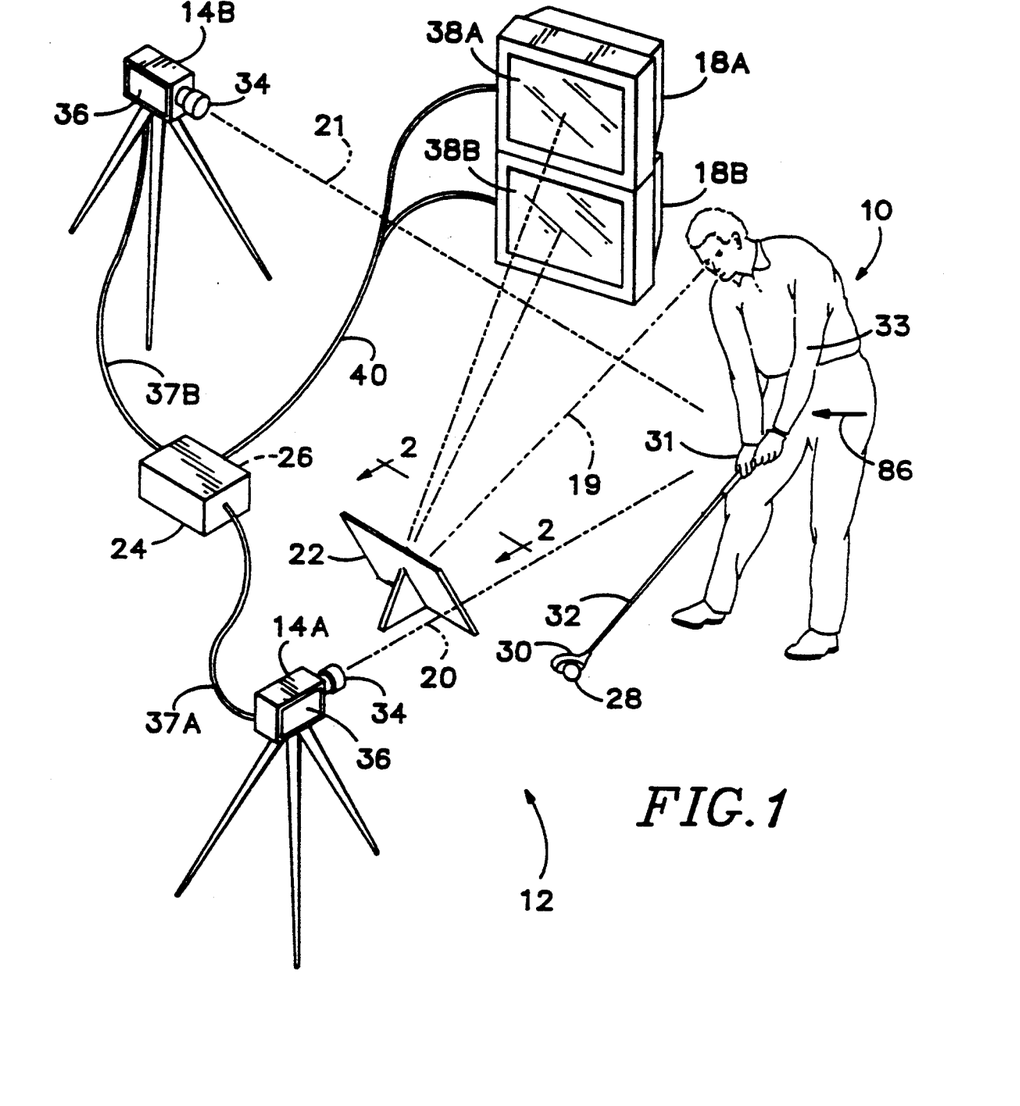
FIG. 1 is a perspective view of an exemplary sports training device in accordance with the present invention in use by a student golfer.

FIG. 1 shows a student golfer 10 using an exemplary sports training device 12 configured in accordance with the present invention. The exemplary sports training device 12 includes a pair of video cameras 14A and 14B, a pair of video monitors 18A and 18B, a mirror 22 and a video overlay generator 24 having a side panel 26 including a matrix-type array of oversized pressbutton switches (not visible).

In FIG. 1, certain of the elements of the training device 12 are shown, for ease of reference, in positions that are somewhat offset from their normal positions in an actual training setup. In particular, the mirror 22 is normally located more forwardly than shown, in a position adjacent the ball 28, so that the golfer 10 can view the pair of video monitors 18A and 18B through the mirror while simultaneously keeping his line of sight 19 centered on the ball. The video overlay generator 24 is normally positioned sufficiently near the golfer 10 so that the golfer can selectively operate the oversized pressbutton switches with the head end 30 of the club 32 while maintaining the golfer's preferred stance for beginning the golf swing.

The pair of video cameras 14A and 14B are suitably arranged to capture the live image of the student as viewed, respectively, from a front-facing direction 20 and side-facing direction 21. The front and side images that result have been found effective for displaying golf swing technique. If desired, however, another camera may be included for obtaining a top view and a wholly different arrangement of cameras may be preferable for an activity different than golf. Each camera desirably includes a zoom lens 34, a tape holding chamber 36, a slow-motion replay and record feature, and an I/O port (not shown) for transmitting images and receiving control signals. The cameras 14A and 14B that are shown in FIG. 1 are of the popular 8 mm camcorder-type.

Each visual monitor 18A or 18B includes a display screen, 38A and 38B, respectively, and a video input port (not shown). The visual monitors are stacked together, one atop the other, to provide a split-screen for simultaneous display of the front and side images, respectively. The distance of the mirror 22 to the visual monitors 18A and 18B is adjusted so as to vary the size of the reflected image of the visual monitors until the full image of the visual monitors can be seen by the golfer while looking down toward the ball.

Figure 2:
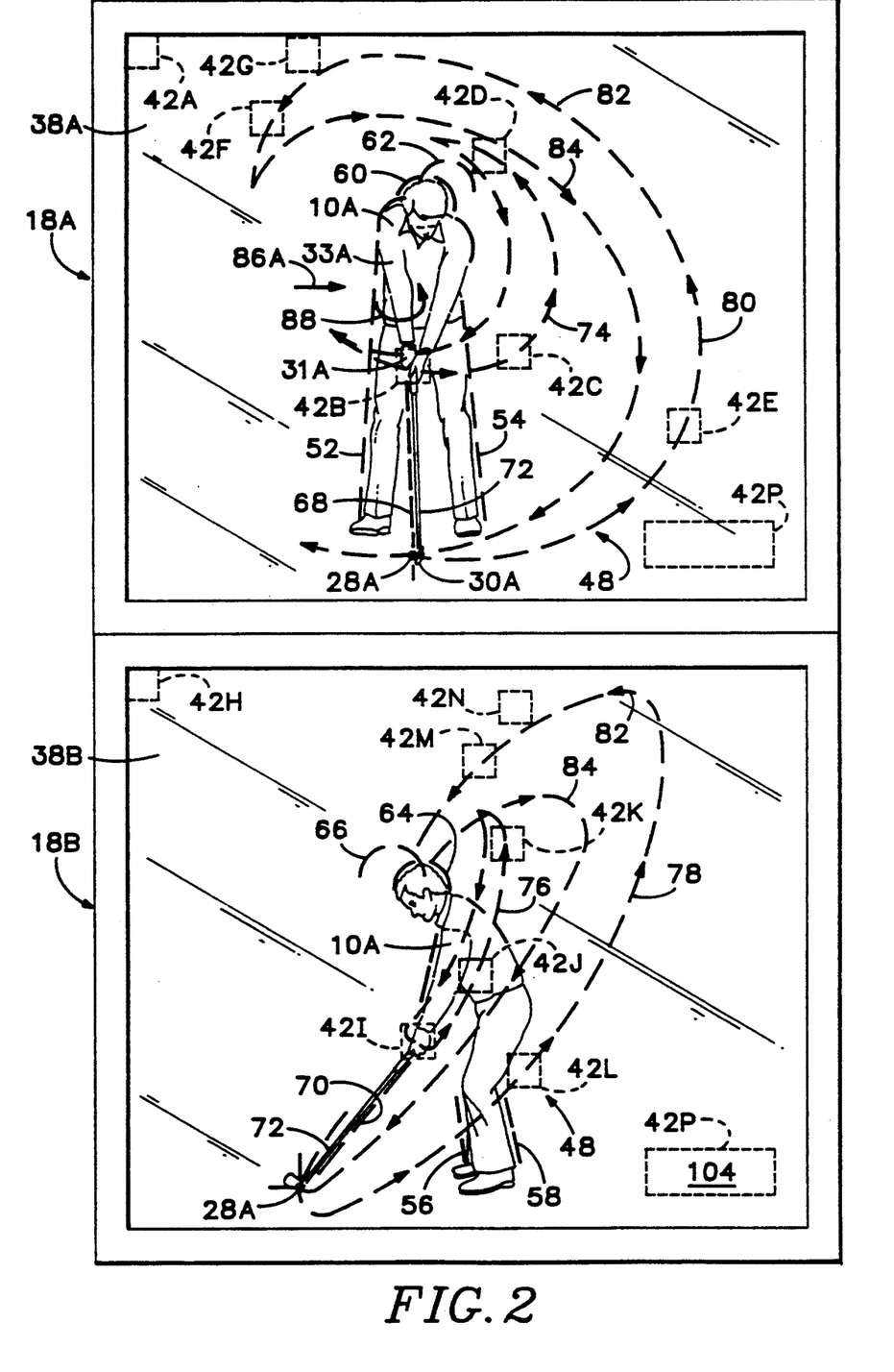
FIG. 2 is an elevational view of a split-screen display of superimposed video images, in accordance with the present invention, as selectively displayed on the monitors and as viewed in the mirror of the exemplary device of FIG. 1 along lines 2—2.

The exemplary video overlay generator 24, hereafter referred to as "VOG," processes the live images (front and side) of the student before they are displayed on the visual monitors 18A and 18B, that is, while the live images are still in video signal format. In particular, the VOG 24 receives the live images via cables 37A and 37B and combines them with corresponding static images or "templates" 48 (FIG. 2) that represent, in outline form, the dynamic technique of the master in a particular game situation. These static images are selectively generated by the VOG from a collection of similar-type images which are stored in the VOG as coded data. Referring to FIGS. 1 and 2 together, after combination, the live images 10A (front and side) and their corresponding static images 48 are transmitted to the visual monitors 18A and 18B, via a video cable 40, for simultaneous superimposed display on the display screens 38A and 38B.

The term "superimposed display" as used herein and in the claims has a specialized meaning that will now be explained. If each display screen, 38A or 38B, is divided, by row and column, into a number of small but discrete display locations (e.g., 42A-N), the corresponding static image of the master's technique 48 is deemed to be superimposed over the live image of the student 10A when both types of image commonly occupy at least certain ones of such display locations (e.g., 42B and 42I).

In FIG. 2, two types of static images 48 are shown for representing the technique of the master. The first type of static image, used to represent a stationary component of the technique, uses a dashed reference line or curve to delineate the placement of a representative extremity of the master at the start or finish of the technique. For example, lines 52, 54, 56, and 58 delineate the initial placement of the master's legs and torso; curves 60, 62, 64, and 66 delineate the initial and final placement of the master's head; and lines 68 and 70 delineate the initial placement of the club gripped by the master (the club, in this instance, being a nonimmediate extremity). The second type of static image, used to represent a dynamic component of the technique, uses a connected outline to delineate successive positions of a representative extremity of the master at a number of different times during execution of the technique. For example, dashed outlines 74 and 76 delineate successive positions of the moving hands of the master and dashed outlines 78 and 80 delineate successive positions of the club head as moved by the master. Although, in FIG. 2 outlines 74-80 are shown in dashed form, this has been done for ease of illustration, and such outlines may also be made continuous, the important principle being that more than one position is represented by each outline. As shown, directional arrows 82 and 84 are used to identify the backswing and downswing components, respectively, of each technique.

The use of the described static image 48 to represent the dynamic technique of the master and the on-screen superimposition of this static image with the live image 10A of the student, enables the student 10 to closely pattern his dynamic technique after that of the master. For example, with reference to the images shown on the top screen 38A in FIG. 2, the student practicing his upswing will attempt to guide his hands so that the on-screen image of his hands 31A moves along the path of the respective display locations (e.g., 42B-D) that are occupied by different portions of the hand outline 74. Concurrently, the student attempts to guide the club so that the on-screen image of the club head 30A moves along the path of the respective display locations (e.g., 42E-F) occupied by different portions of the club head outline 80.

The student, moreover, attempts the same "tracing" action in regard to the lower screen 38B so that, for example, the on-screen image 10A moves across display locations 42C, 42E, 42J, and 42L, or across display locations 42D, 42F, 42K, and 42M, in unison. Referring to FIGS. 1 and 2 together, the mirror 22, by reversing the images shown on the visual monitors 18A and 18B, makes this tracing action easier because a movement of the student's left arm 33 in a rightward direction 86 appears, in the mirror, as a corresponding movement of a left arm 33A in a rightward direction 86A.

From the above description of the preferred training method, it will be recognized that precision of movement, and not pace, is the primary focus of the method. What matters is that each portion of the live image be moved, in correspondence with the others, to its prescribed location, not how long it takes to reach those locations. Once the student's muscles have been trained to properly execute the master's technique in slow motion, the pace of the technique can readily be increased. Conventional methods that attempt to teach both precision of movement and pace (e.g., by using a dynamic image of the master's technique) present the student with the impossible task of tracing through multiple points where each point is itself a moving image. The end result of such methods is that the student merely attempts to imitate the broad lines of movement of the master.

To understand more fully the benefits of the described training system, it is helpful to consider the basic movements involved during execution of a particular technique. In all, three fundamental hand and arm movements have been identified that contribute to the overall movement typically developed during a golf swing. The first of these is the lateral wrist cock obtained, for example, by placing the palm of the hand on a flat table and cocking the wrist from side-to-side. It is generally accepted that proper swing technique requires cocking of the wrist during the upswing and holding of this condition during most of the downswing until final release of the cocked wrist just before impact of the club with the ball. The second type of basic movement, one preferably avoided, is the forward or backward wrist swing obtained by swinging the hand in a direction generally perpendicular to the palm.

The third type of basic movement is a forward or backward rotating movement of the forearm and hand, in unison, about the long axis of the forearm. When this movement tends to bring the palm face up, this can be termed "supination" (to suggest the supine position of the hand obtained) or, conversely, when this movement tends to bring the palm face down or rearward, this can be termed "pronation" (to suggest the prone position of the hand). It is generally accepted that before impact of the club with the ball, some degree of supination of the dominant arm (e.g., the left arm for a right-handed golfer) should occur so that the club head squarely impacts the ball.

Referring now to FIG. 2, it has been discovered, in developing the exemplary training device 12, that it is typical for a master golfer, when nearing the top of his or her upswing, to increasingly pronate his or her dominant arm, by rotating it in the direction 88 shown, and then to maintain this pronation during the downswing until just before impact of the club head with the ball. It has also been found that a typical student, conversely, will supinate his or her arm when reaching the top of the upswing. Accordingly, even though the student properly moves the hands in suitably cocked position along the hand outline 74, to the upswing position delineated at display locations 42D and 42K, unless his or her arm is properly pronated, the club head image 30A will end up at display locations 42G and 42N. Not until the student rotates his arm in the correct direction 88 will the club head image shift to its desired display locations 42F and 42M. It will now be recognized just how use of multiple outlines forces the student to adopt the same basic movements as the master and develops, in the student, a more efficient and powerful swing.

Figure 3:
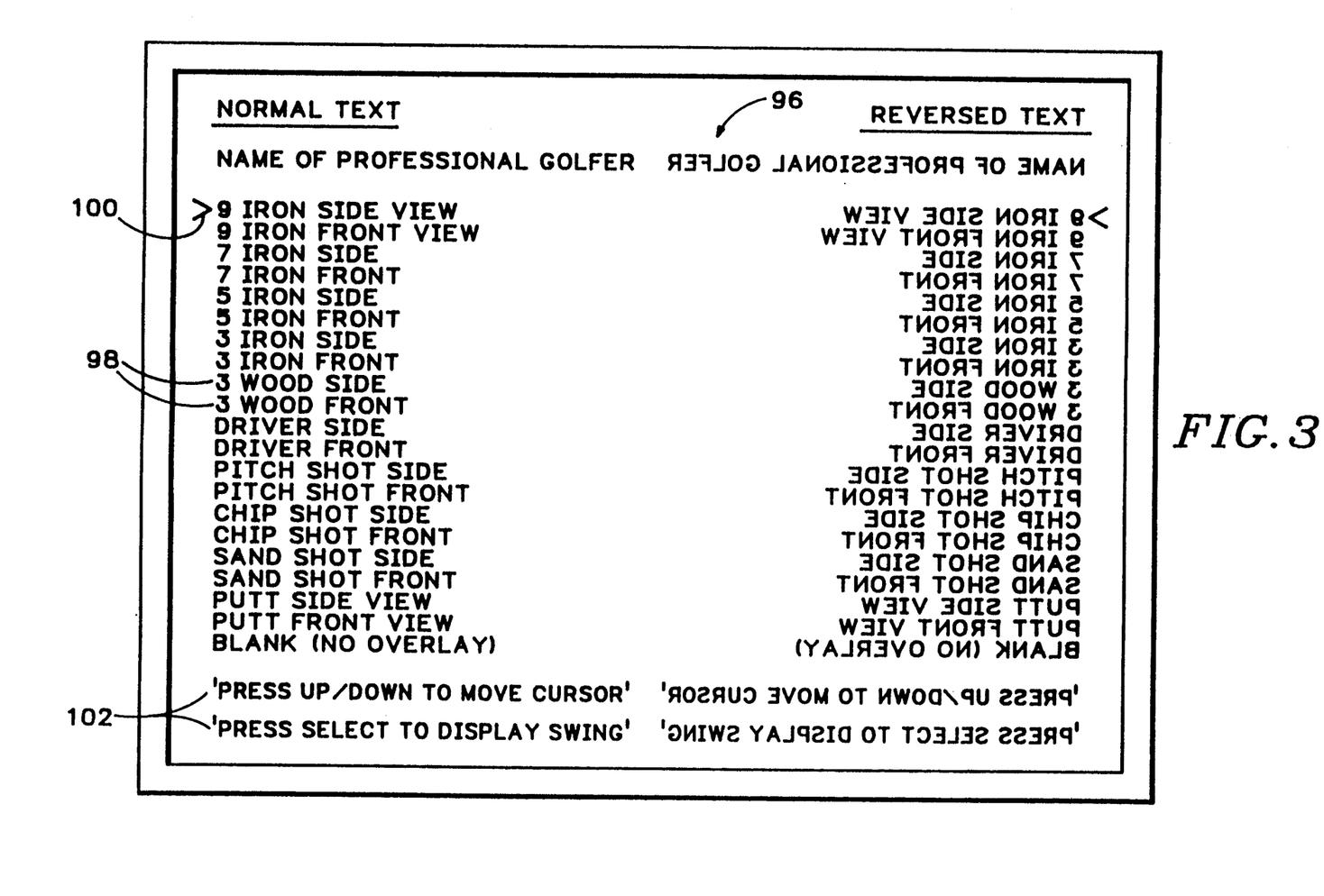
FIG. 3 is an elevational view of a main menu display, in accordance with the present invention, as selectively displayed on the monitors of the exemplary device of FIG. 1.

Referring to FIG. 3, for ease and flexibility in selection, when the VOG 24 and visual monitors 18A and 18B are first turned on, appearing on the screen of the monitors, in place of the static images 48 of the master's technique shown in FIG. 2, is a main menu 96. The menu 96 has a listing of ten alternative golfing situations 98 (e.g., in one type of situation the "3 Wood" technique is used) and includes a cursor 100 that can be moved on the screen to select the pair of templates (front and side views) that correspond to the desired golfing situation. At the bottom of the screen are instructions 102 that identify respective ones of the switches on the side panel 26 (FIG. 1) of the VOG 24 and explain how such controls are operated to move the cursor and to make a selection. Accordingly, the student golfer can use the head 30 of the club 32 to select a desired type of situation while maintaining his or her starting stance proximate the ball 28. The selections and on-screen instructions appear in both "Normal Text" (for direct viewing) and "Reversed Text" (for viewing through the mirror 22).

FIG. 2 shows the specific images 48 of the master's technique appearing on the upper and lower screens 38A and 38B after the "5 Iron" golfing situation is selected on the menu of FIG. 3. Certain of the display locations 42P on each screen are reserved for the display of a help message 104. This help message, shown in FIG. 4, has instructions 106, 108, and 110 pertaining, respectively, to on-screen calibration commands, teaching-mode commands, and a return to main menu command. As with the main menu 96, each instruction on the help message 104 appears in both normal text and reverse text.

Figure 4:
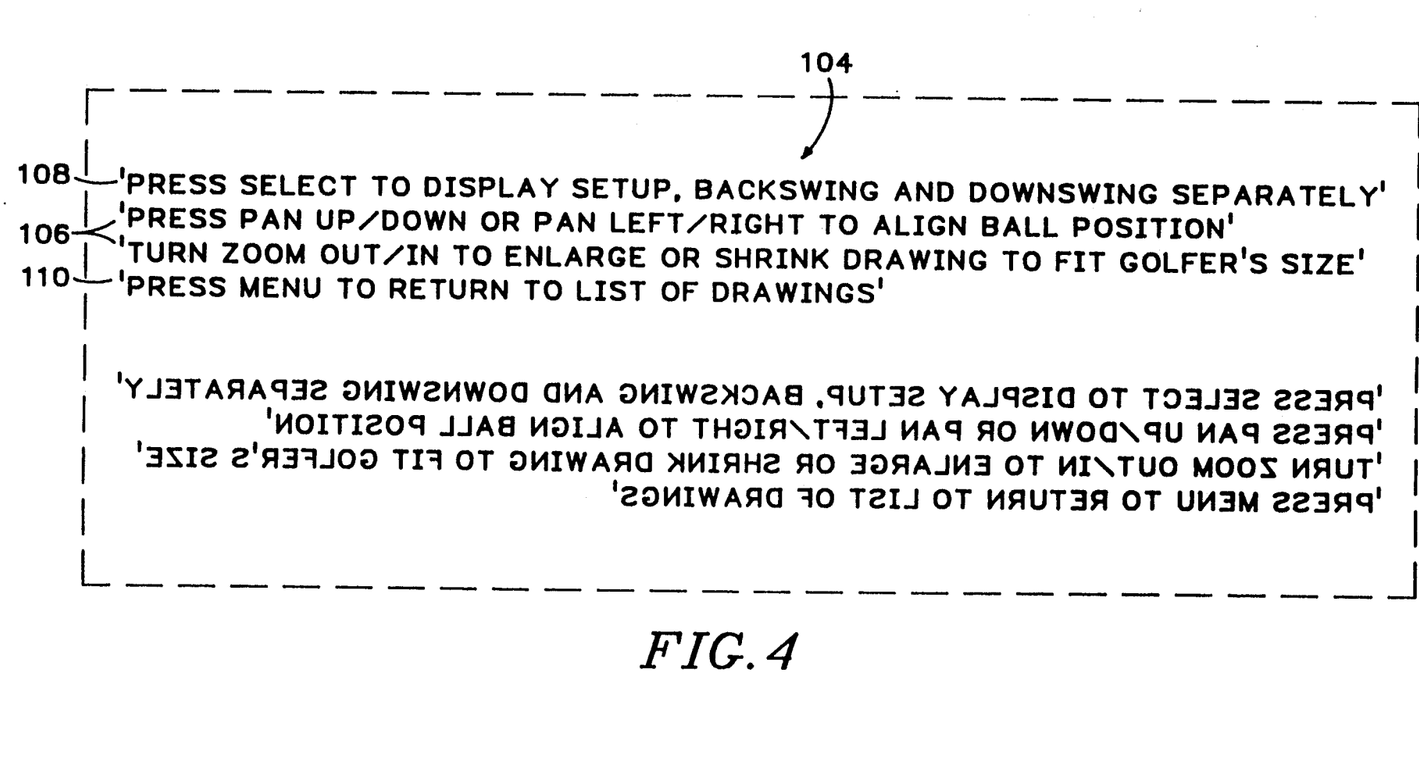
FIG. 4 is an enlarged view of the display locations indicated by reference numeral 42P in FIG. 2 showing the help message provided therein.

The calibration commands 106 are used for aligning, on each screen 38A or 38B, the static image 48 of the master's technique with the live image 10A of the student. In particular, the student first uses the pan up or down and pan left or right controls to align the ball portion of the static image 48 with the ball portion 28A of the live image. Next, the student uses the zoom out or in controls to vary the size of the static image 48 until it matches the size of the live image 10A.

The teaching-mode commands 108 enable the student to view, separately, the starting pose and the various components of the dynamic technique of the master. For example, after selecting the static images 48 shown in FIG. 2, the student may then decide to view only the "setup" or starting pose component of the technique (lines 52–70) by pressing down one time on the SELECT control. This causes the outlines 74–80 that represent dynamic technique to be hidden from view. Next, the student may decide to view only the backswing component of the technique by pressing down a second time on the SELECT control. This causes each of the "setup" lines 52–70 and the portions of outlines 74–80 that are marked by downswing arrows 84 to be hidden from view. By pressing a third time on the SELECT control, the student can separately view the downswing component of the technique, and by pressing a fourth time on the SELECT control, the student can return to the initial view shown in FIG. 2 wherein the starting pose and each component of the dynamic technique are displayed simultaneously together. In this simultaneous view, for clarity of display, each component is preferably shaded in a different color so that, for example, the starting pose lines 52–70 are green, the backswing portions of outlines 74–80 are red, and the downswing portions of outlines 74–80 are blue.

After completing a training session, the student can return to the main menu 96 (FIG. 3) using the main menu command 110 (FIG. 4) and select a new golfing situation using the same steps that have already been described. Alternatively, provided that the tape holding chamber 36 of each camera 14A or 14B has previously been loaded with tape and the live training session recorded, the student can choose to continue displaying the static image 48, as shown in FIG. 2, while playing back the recorded session. In this manner, the student may evaluate his or her technique post-session, either alone or in the company of an instructor, to determine how closely his or her technique matched the technique of the master and to decide what changes in movement are needed to bring about closer conformance therewith. In particular, after sufficient practice of the technique at slow speed using the template images for immediate feedback, the student may find it helpful to perform the same movement at normal or "full" speed while recording the movement using a fast shutter setting on the video cameras. Then, using the slow-motion replay feature of one or the other camera, the student can compare his full-speed technique with that of the master.

Figure 5:
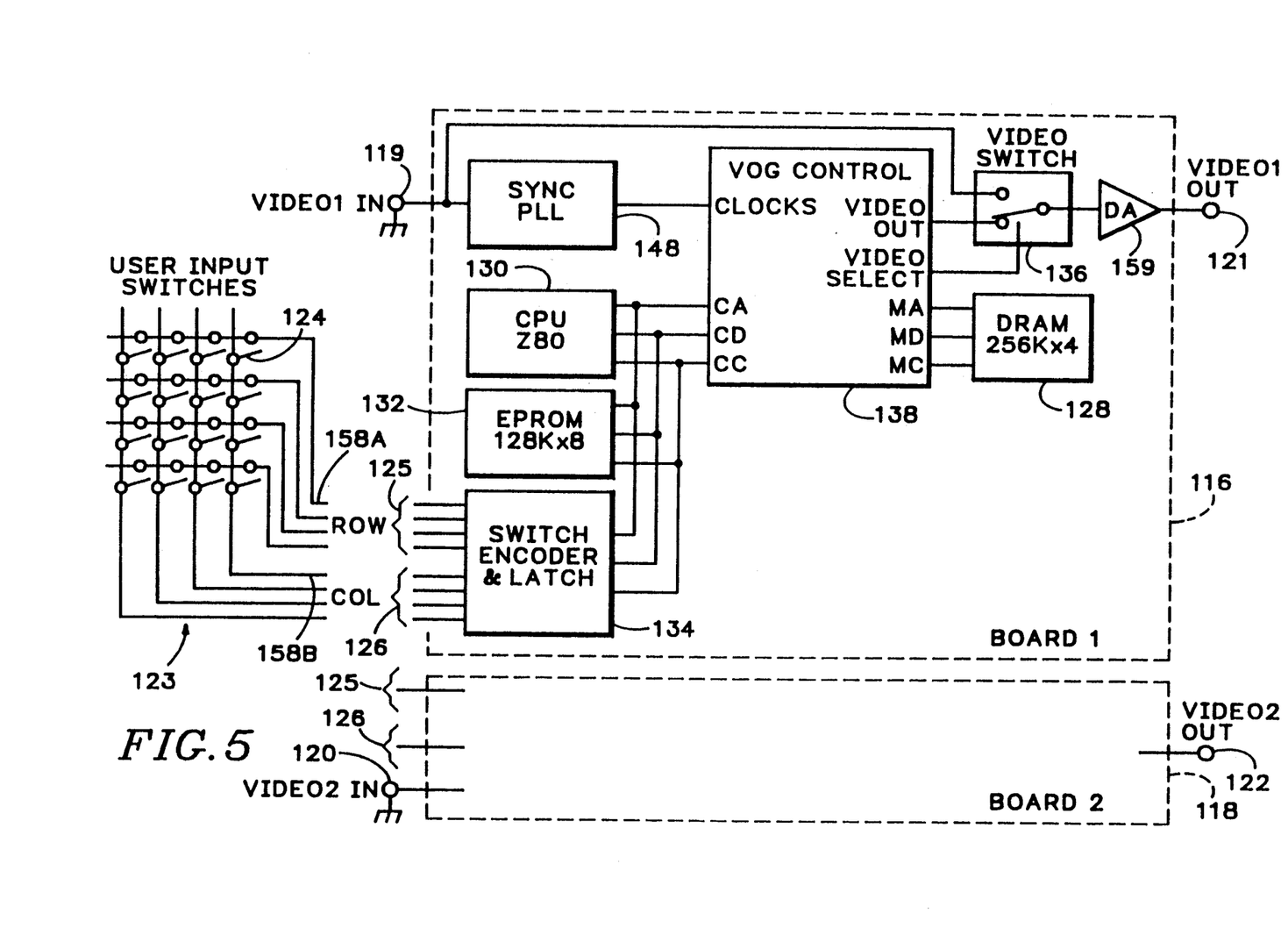
FIG. 5 is a block diagram showing the internal architecture of the video overlay generator box of FIG. 1.

The construction and operation of the exemplary video overlay generator 24 will now be explained with reference to FIGS. 5–8. In FIG. 5, a block diagram is shown identifying the electronic components constituting the video overlay generator. As shown, the VOG 24 includes a first and second board 116 and 118 that separately process the front and side images, respectively, of the student. These live images are received via cables 38A and 38B (FIG. 1) at the input ports 119 and 120 of the VOG 24. At the completion of processing, the boards 116 and 118 produce, at their respective outputs 121 and 122, either a combined signal conveying the live image and template image together, thereby producing an on-screen display of the type shown in FIG. 2, or a signal conveying the menu image, thereby producing an on-screen display of the type shown in FIG. 3 (for each visual monitor). Both types of signal output are compatible with existing standards for composite television signals.

Referring to FIGS. 1 and 5 together, in order for the user to interface with the VOG, the pressbuttons on the front panel 26 of the VOG are formed into a matrix-type arrangement of input switches 123, each pressbutton switch (e.g., 124) being of the single-pole single-throw (SPST) type and connecting a particular ROW line to a particular COLUMN line when closed. The ROW and COLUMN lines are connected to the ROW and COLUMN input bus 125 and 126, respectively, of both the first board 116 and the second board 118. Although not explicitly shown, the internal devices of the second board 118 are the same as those of the first board 116.

Figure 6:
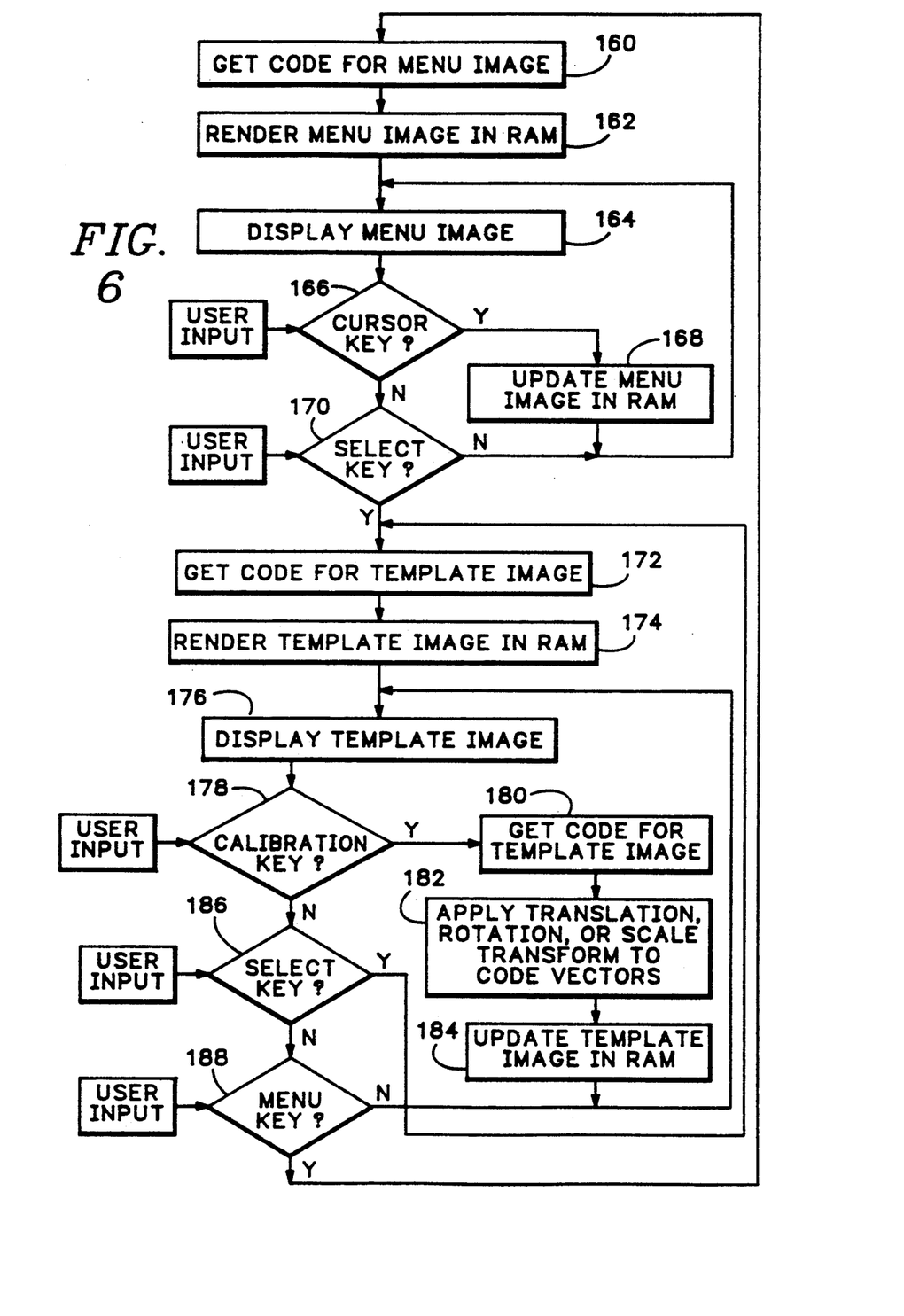
FIG. 6 is a flow diagram showing, in sequence, the operations performed by the CPU device of FIG. 5.

Generally speaking, there are two principal groups of devices on each board 116 or 118. The first group, constituting the "image creating" devices, interact with the dynamic random access memory or DRAM 128 during even-numbered memory cycles (e.g., cycles 0, 2, 4, . . . ). The purpose of this first group is to decide what image will be created (e.g., a menu image, a template image, or an update image) and to transfer the selected image to the DRAM 128 for storage of the image as an addressable bitmap array. The devices primarily included in this first group are a central processing unit or "CPU" 130, an erasable programmable read-only memory or "EPROM" 132, and a switch encoder and latch unit 134. A flow diagram outlining the sequence of operations that are performed by this first group of devices is shown in FIG. 6.

Figure 7:
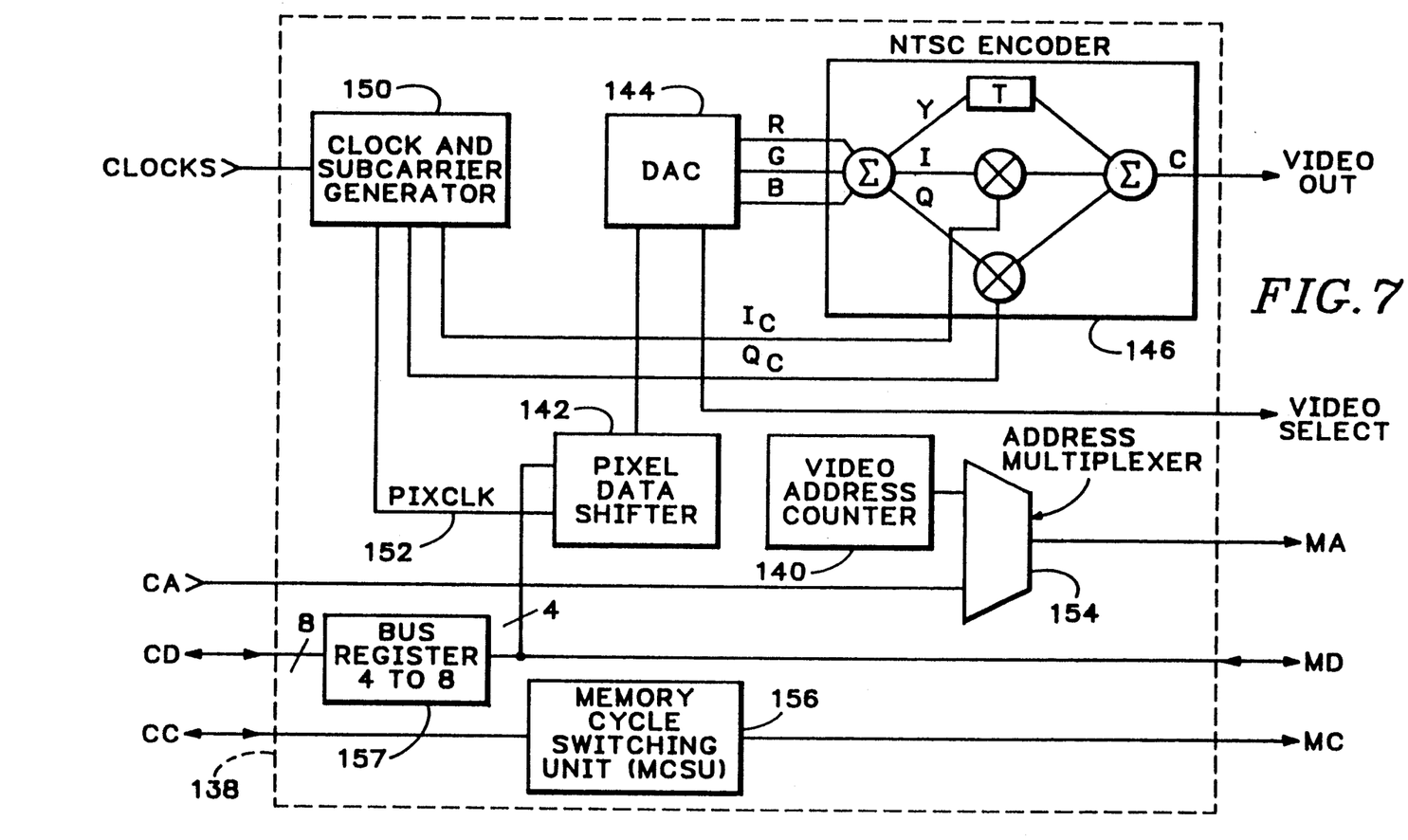
FIG. 7 is a block diagram showing the internal architecture of the VOG control device of FIG. 5.
Figure 8:
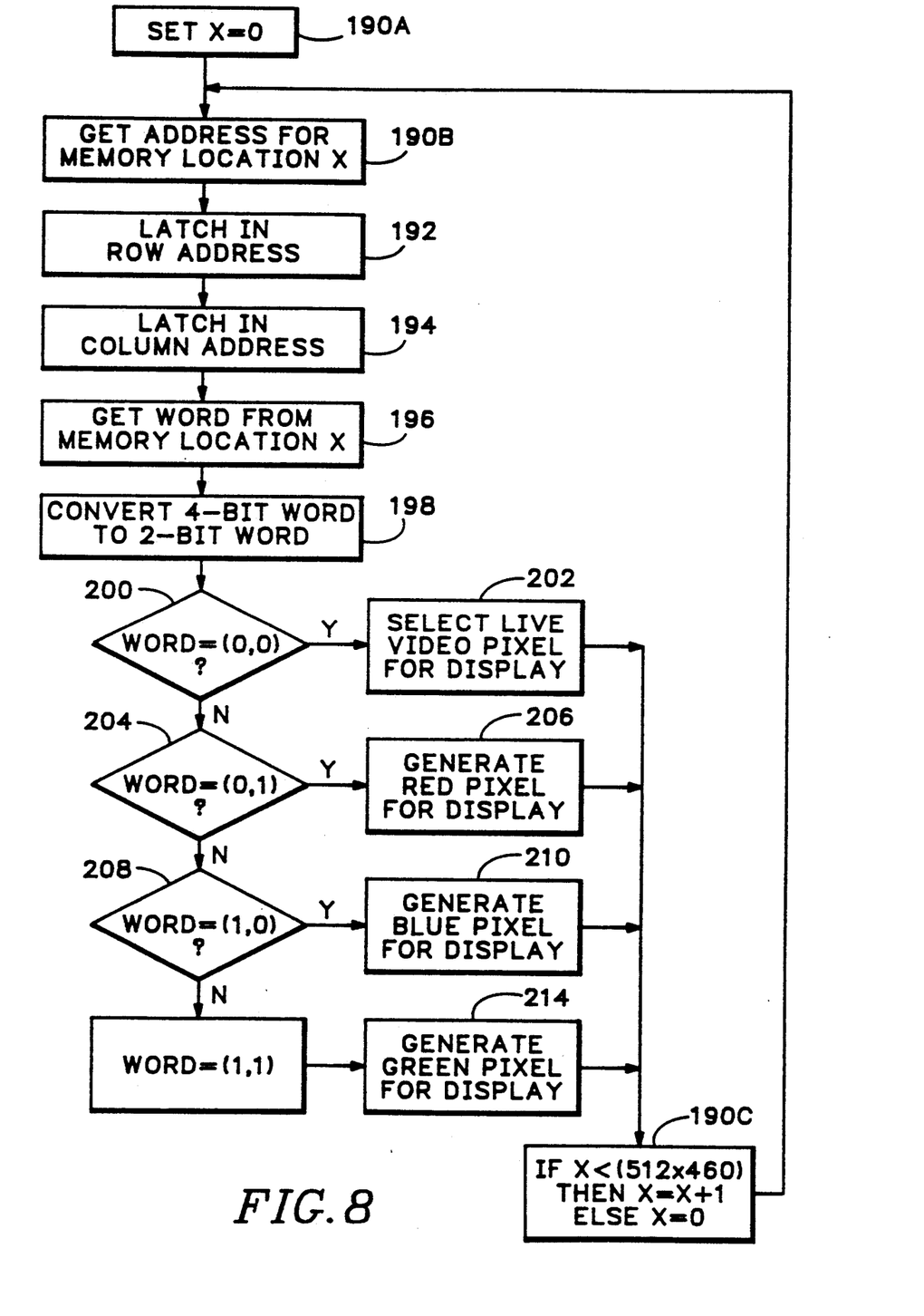
FIG. 8 is a block diagram showing, in sequence, the operations performed by the image displaying group of devices of FIG. 5.

The second group of devices, constituting the "image displaying" devices, interact with the DRAM 128 during odd-numbered memory cycles (e.g., cycles 1, 3, 5, ...). The purpose of the second group is to retrieve portions of the most recent image stored in the DRAM, to sequentially translate each portion or bitmapped word in this image into picture information, and to generate a composite video signal output where either picture information isolated from the live image or picture information developed from the DRAM-stored data is selected to define the pixel value at a given location on the viewing screen. The devices included in this second group are a video switch 136 and several devices that are part of a VOG control unit 138. Referring to FIG. 7, showing the various devices forming the VOG control unit 138, the devices belonging to this second group include a video address counter 140, a pixel data shifter 142, a digital-to-analog converter or DAC 144, and an NTSC encoder 146. A flow diagram outlining the sequence of operations that are performed by this second group of devices is shown in FIG. 8.

The VOG includes a third subsidiary group of devices that synchronize the operation of the first and second group with each other and with the live video image received from the cameras 14A and 14B (FIG. 1). Referring to FIGS. 5 and 7 together, this group includes a phase lock loop synchronizer or SYNC PLL 148 connected in tandem with a clock and subcarrier generator 150. These devices generate a pair of quadraphase-shifted carrier signals, $I_c$ and $Q_c$, that are mixed, respectively, with the I and Q signals developed in the NTSC encoder 146, and, more importantly, produce the clock signals (e.g., 152) that control the overall rate at which the VOG devices operate.

This third group also includes the address multiplexer 154 and the memory cycle switching unit or "MCSU" 156 which enable the CPU 130 and the video address counter 140 to time-share the address lines "MA" of the DRAM 128. For example, on even-numbered memory cycles, the MCSU 156 toggles the multiplexer 154 so that the address lines "CA" of the CPU 130 are connected to the address lines of the DRAM 128, while on odd-numbered memory cycles, the MCSU toggles the multiplexer so that the address lines of the video address counter 140 are connected to the DRAM's address lines. Moreover, the MCSU 156 enables addressing of the DRAM even though there are only nine lines in the address bus "MA" and even though an 18-bit address is needed to fully specify a unique memory location of the 256K (512 row by 512 column) DRAM. The MCSU performs this task by alternately sending to the DRAM, on the memory control bus "MC," either a "row address" strobe, signifying that a valid row address (the upper nine bits of the full address) are latched onto the "MA" bus, or a "column" address strobe, signifying that a valid column address (the lower nine bits of the full address) are latched onto the "MA" bus. These row and column addresses may originate with either the CPU 130 or the video address counter 140.

Referring to FIGS. 5 and 7 together, to construct the exemplary VOG 24, the following commercially available devices were chosen:

for the CPU 130, Model HZ84COO-10 made by Toshiba America of Irvine, Calif.;
for the 256×4 DRAM 128, Model MT4C4256 made by Micron of Pocatello, Id.;
for the 128K×8 EPROM 132, Model 27CO10 made by Intel of Santa Clara, Calif.;
for the NTSC encoder 146, the phase lock loop synchronizer 148, and the clock and subcarrier generator 150, Model MC1378 made by Motorola of Phoenix, Ariz.;
for the memory cycle switching unit 156, CMOS logic gates made by Toshiba America of Irvine, Calif.; and
for the DAC 144, Model BT478 made by Brooktree of San Diego, Calif.

It will be recognized from the foregoing and following description of VOG operation, that there are many other specific models of devices that would perform successfully in this application and that the preceding list is intended to be illustrative rather than limiting. Moreover, the functions described herein could be implemented using customized integrated circuit technology.

To assemble the image that will be transferred to the DRAM 128, the CPU 130 performs the sequence of operations that are outlined in FIG. 6. The program listing that instructs the CPU 130 when to perform the operations is stored in the EPROM 132. Also stored in the EPROM, in coded format, is a menu image listing, a blank image listing, and 40 different template image listings. These 40 template image listings fully define the four types of teaching mode images that are available for each of the ten types of golfing situations. For example, template listings 1–4 define, respectively, the full image, the set-up image, the backswing image, and the downswing image for the 9-Iron situation, while template listing 37 defines the full image for the putt situation.

The menu listing can be generated using a standard word-processing program. Each template listing is preferably generated by scanning a recorded image of the master's dynamic technique, in a selected golf situation, and editing the image using a program, such as ADOBE ILLUSTRATOR ™, that can be used to trace outlines of selected objects in the image and that will store the outlines in a memory-conserving format such as encapsulated postscript (EPS). In this particular coded format a line, for example, is vectorially described by its two end-points, in contrast to a bitmapped format where every point on the line is individually mapped out. The image listings, both menu and template, are compiled, linked, and loaded into the EPROM. Before relaying image data to the DRAM, the CPU 130 converts the data from the coded format in which it is stored (i.e., ASCII format for the menu image and EPS format for the template image) into a bitmapped format. In this manner, the active display area of the DRAM 128 (organized as 512×460 memory locations) corresponds to a viewing screen and each four-level bit or data word in a given memory location corresponds to a pixel value in a given location on the viewing screen.

Referring to FIG. 5, the CPU 130 is interconnected with other devices in the first group by conventional type address (CA or MA), data (CD or MD), and control (CC and MC) busses. When reading image data from the EPROM, for example, the CPU latches a word on the address bus specifying a memory location in the EPROM, transmits a strobe signal on the control line signifying the stability and validity of that word, and receives the image data then sent out by the EPROM on the data bus. The same three types of signals are similarly involved in write operations. Referring to FIG. 7, as described above, the CPU time-shares the address lines "MA" of the DRAM with the video address counter 140. Moreover, the 4-bit data bus "MD" of the DRAM is fed to a 4- to 8-bit bus register 157 for conversion to a an 8-bit bus before connection with the data lines CD of the CPU 130. Control signals are passed back and forth between the CPU 130 and the MCSU 156 to let each device know when valid data has been latched onto bus MD.

Referring now to FIG. 6, when the VOG 24 is first turned on, the CPU begins operation by retrieving the menu image code stored in the EPROM, block 160, and, after converting the code to bitmapped format, writes or "renders" the menu image data, during even-numbered memory cycles, to the DRAM 128, block 162. Operation of the second group of circuits, during odd-numbered memory cycles, ultimately causes the menu image data in the DRAM to be displayed on the screen, block 164, in the form shown in FIG. 3.

Next, the CPU polls the switch encoder and latch 134 to determine if the cursor switch or key has been pressed by the user, block 146. If switch 124 in FIG. 5 is the cursor switch, for example, closing the switch connects a respective one of the ROW lines 158A with a respective one of the COLUMN lines 158B. The switch encoder and latch 134, detecting that these lines have been connected, generates a coded word identifying switch 124. When the CPU 130 calls on or "polls" the switch encoder and latch 134, this word is latched onto the data lines "CD" enabling the CPU to determine that the cursor key has been selected. The CPU, upon recognizing this event, sends data to the DRAM that updates the menu image, block 168, so that, for example, the cursor 100 of the menu display shown in FIG. 3 will shift down two lines to indicate the next golfing situation.

If the cursor key has not been pressed, the CPU next determines if the SELECT key has been pressed, block 170. If not, redisplay of the menu image formerly stored in the DRAM occurs, block 164, and the operations repeat as shown. If the SELECT key has been pressed, the code for a selected one of the full image template listings is retrieved from the EPROM, block 172, based on the number of times the cursor key has been pressed. After the CPU converts the template image code into bitmapped format, the template image is then written to or rendered in the DRAM, block 174. There it is operated on by the second group of devices to produce a display, block 176, similar to that shown on the viewing screen 38A or 38B in FIG. 2. The operation of the second group of circuits is the same whether a menu image, block 164, or template image, block 176, is stored in the DRAM, and is outlined, in detail, in the flow diagram of FIG. 8.

After rendering the template image in the DRAM, the CPU next determines if one of the calibration keys (e.g., pan up, pan down, pan left, pan right, zoom in, or zoom out) has been selected by the user, block 178. If so, the CPU retrieves the template image data from the EPROM, block 180, and transforms the vectorially-described data, in a standard manner by computing its product with a translation or scaling matrix, block 182. Memory space in the DRAM not reserved for active display is utilized in this computation. Thereafter, the CPU sends the transformed data to the DRAM to update the template image, block 184, and the updated template image is then displayed, block 176. Selection of the "Zoom In" switch, for example, causes multiplication of the ROM template data by a scaling matrix, ultimately resulting in a reduction in the dimensions of the template image 48 (FIG. 2) displayed on the screen. Optionally, a "Rotate" switch and a rotational matrix are added to enable rotation as well as translation of the on-screen template image. For faster scaling, a "Fast Zoom" switch can be added that, when selected, causes the CPU to send a control signal along lines 37A and 37B (FIG. 1) that varies the setting of the zoom lenses 34 of the corresponding cameras 48A and 48B.

If the CPU determines that none of the calibration keys have been selected, block 178, it next decides if the SELECT key had been pressed, block 186. If so, the CPU retrieves a new template image listing from the EPROM, block 172, and sends the image data recovered, in bitmapped format, to the DRAM for display. For example, if the fifth template listing (defining the full image of the 7-Iron situation) was retrieved during the original sequence, in this first repeat sequence the sixth template listing is retrieved (the set-up image). Additional toggling of the SELECT key while in the template image mode, block 186, causes the CPU to successively retrieve the seventh template listing (the backswing image), the eighth template listing (the downswing image) and then, once again, the fifth template listing (the full display image).

If the SELECT key has not been pressed, the CPU next determines of the MENU key has been pressed, block 188. If not, the template image already stored in the DRAM is redisplayed, block 176. If so, the entire sequence starts over again beginning with retrieval of the menu image listing from the EPROM, block 160.

The operation of the second group of devices, which display the image (menu or template) stored in the DRAM 128, is outlined in FIG. 8. Referring also to FIG. 5, the video address counter 140 sequentially generates the addresses that correspond to the active display area of the DRAM, beginning with location 0, blocks 190A and 190B. As each address is generated, first the 9-bit "row" or upper portion of the address is latched onto the address bus MA, block 192, and then the 9-bit "column" or lower portion of the address is latched on to the address bus, block 194. Each such latching operation is initiated by the memory cycle switching unit 156 that sends a control signal to the address multiplexer selecting either the upper or lower input lines of the multiplexer.

The MCSU 156 also sends a row or column strobe to the DRAM, on control bus MC, to signify that either the row or column address has been latched a sufficient amount of time to properly stabilize. Shortly after receiving the strobe signal, the DRAM outputs the image data stored in the addressed memory location, block 196. The image data retrieved from memory location 0, for example, will eventually determine the pixel value in the upper leftmost display region of the viewing screen. This one-to-one correspondence between memory location and viewing screen location is a result, as described above, of the bitmapping earlier performed by the CPU 130.

The retrieved image data is next converted, by the pixel data shifter 142, from a 4-bit word to a 2-bit word, block 198, and is received, in this format, by the digital-to-analog converter or DAC 144. If the received word is (0,0), the DAC 144 then sends out a default signal on the VIDEO SELECT line. This, in turn, causes the input of the video switch 136 (FIG. 5), which normally connects with the VIDEO OUT line, to temporarily connect instead with the "VIDEO (1 or 2) IN" line, so that the pixel value obtained is directly determined by picture information carried by the live image instead of by that processed from the DRAM-stored data, blocks 200 and 202.

If, on the other hand, the received word is (0,1) (1,0), or (1,1), the DAC 144 transmits an analog signal to the NTSC encoder 146 on the red color line, green color line, or blue color line, respectively. The NSTC encoder 146, using a standard approach, adds together, in weighted proportion, the color signals at its input so as to develop the conventional I, Q and Y (luminance) signals. The encoder then mixes the I and Q signals with quadraphase-shifted carriers and recombines each of the signals, as shown, to produce a C (chrominance) signal. The video switch 136 (FIG. 5), now obtaining its pixel value from the "VIDEO OUT" line, conveys either red picture information, blue picture information, or green picture information, depending on whether the word encoded was (0,1), (1,0), or (1,1). This operational sequence is summarized in blocks 204-214. This process of developing picture information from image data is then sequentially repeated for each active memory location and corresponding screen location, block 190C. In this manner, the various components of the static image are colored differently, with green being used to emphasize the set-up component, red being used to emphasize the backswing component, and blue being used to emphasize the downswing component. Of course, with different weighting values, different colors are obtainable so that particular colors can be chosen that are the most visible in a particular setup. The input of the video switch 136 is momentarily toggled to the "VIDEO (1- or 2) IN" line, as needed, to provide blanking and syncing pulses and to provide an output, 121 or 122, that is compatible with existing standards for composite television. The output amplifier 159 is used to amplify the signal to a level compatible with the sensitivity of the visual monitors 18A and 18B.

Referring to FIG. 1, although a detailed description of the internal architecture of the exemplary video overlay generator 24 has been provided, it will be recognized that alternative overlay mechanisms may be used. The simplest such mechanism is a transparent sheet bearing a static image representing, in outline form, the dynamic technique of the master and mountable directly over the viewing screen 38A or 38B of the visual monitor.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A sports training device for enabling a student to recreate the dynamic technique of a master comprising:
    (a) video camera means for transmitting a live image of the dynamic technique of the student in a selected sports situation;
    (b) visual monitor means for viewing by the student; and
    (c) a video overlay generator for providing a static image representing the dynamic technique of the master in said selected sports situation including overlay means for electronically combining said live image and said static image for simultaneous superimposed display on said visual monitor means.

2. The device of claim 1 wherein said video overlay generator includes calibration means for adjusting the relative sizes of said live image and said static image.

3. The device of claim 1 wherein said video overlay generator includes memory means for storing a plurality of different static images, each respective static image representing the dynamic technique of the master in a different sport situation.

4. The device of claim 1 wherein said static image represents the dynamic technique by an outline delineating the curvilinear path of travel of a respective extremity of said master.

5. The sports training device of claim 1 wherein said video overlay generator includes menu means for selectively listing on said visual monitor means a plurality of different static images for viewing.

6. The device of claim 5, further including selection means operable by the student while remaining in position to start the dynamic technique for selecting a respective one of said plurality of different static images.

7. The device of claim 5 wherein said video overlay generator includes means for generating a cursor image on said visual monitor and means for selecting a respective one of said static images for viewing in conjunction with movement of said cursor image.

8. The device of claim 1 wherein said video camera means includes a first and second video camera, at least one of said first and second video cameras being disposed outside the line of sight of said student.

9. The device of claim 1 wherein said visual monitor means includes a first and second viewing screen together forming a split-screen display means for simultaneous viewing by said student.

10. A sports training device for enabling a student to recreate the dynamic technique of a master comprising:
    (a) video camera means for transmitting a live image of the dynamic technique of the student in a selected sports situation;
    (b) visual monitor means for viewing by the student;
    (c) a video overlay generator for providing a static image representing the dynamic technique of the master in said selected sports situation including overlay means for combining said live image and said static image for simultaneous superimposed display on said visual monitor means; and
    (d) said video overlay generator including blanking means for selectively hiding different components of said static image.

11. A sports training method for enabling the dynamic technique of the student to be closely patterned after that of a master comprising:
    (a) providing a video camera;
    (b) providing a visual monitor having multiple display locations;
    (c) transmitting a live image of the dynamic technique of the student in a selected sports situation using the video camera;
    (d) producing a static image representing the dynamic technique of the master in said selected sports situation, including providing an outline wherein different portions of said outline delineate the path and direction of travel of a selected extremity of said master; and (e) concurrently with step (c), combining said live image and said static image for simultaneous superimposed display on said visual monitor.

12. The method of claim 11, further including the step, carried out by said student, of maneuvering a corresponding extremity while observing said visual monitor so that the live image of said corresponding extremity, while being observed by said student to enable contemporaneous self-corrective action, moves along the path of the respective display locations of said visual monitor that are occupied by said different portions of said outline.

13. The method of claim 11 wherein said selected sports situation is a golf swing that includes a transition between a backswing and a downswing and the student has a dominant arm leading the downswing, said method further including the step of guiding said dominant arm of said student in increasing pronation as said transition is approached.

14. The method of claim 11 including the steps of providing sport equipment and of selecting a second static image, in substitution for said static image originally produced, by manipulating the controls of an image generator with a portion of said sport equipment.

15. A sports training device for enabling a student to recreate the dynamic technique of a master comprising:
  (a) video camera means for transmitting a live image of the dynamic technique of the student in a selected sports situation;
  (b) visual monitor means for viewing by the student;
  (c) a video overlay generator for providing a static image representing the dynamic technique of the master in said selected sports situation including overlay means for combining said live image and said static image for simultaneous superimposed display on said visual monitor means; and
  (d) mirror means disposed within the line of sight of said student for enabling the student to indirectly view said visual monitor means while executing the dynamic technique.

* * * * *